(12) United States Patent
Bellinger (10) Patent No.: US 8,091,344 B2
(45) Date of Patent: Jan. 10, 2012

(54) SYSTEM FOR MODIFYING EXHAUST GAS FLOW THROUGH AN AFTERTREATMENT DEVICE

(75) Inventor: Steven M. Bellinger, Columbus, IN (US)

(73) Assignee: Cummins Inc., Columbus, IN (US)

( * ) Notice: Subject to any disclaimer, the term of this patent is extended or adjusted under 35 U.S.C. 154(b) by 593 days.

(21) Appl. No.: 11/423,865

(22) Filed: Jun. 13, 2006

(65) Prior Publication Data

US 2007/0283683 A1 Dec. 13, 2007

(51) Int. Cl.
F01N 3/00 (2006.01)

(52) U.S. Cl. ............... 60/292; 60/295; 60/297; 60/311; 60/324

(58) Field of Classification Search .............. 60/295, 60/297, 324, 287, 288, 311
See application file for complete search history.

(56) References Cited

U.S. PATENT DOCUMENTS

| | | | | |
|---|---|---|---|---|
| 4,835,963 A * | 6/1989 | Hardy | | 60/274 |
| 5,065,576 A * | 11/1991 | Kanazawa et al. | | 60/295 |
| 5,067,319 A * | 11/1991 | Moser | | 60/288 |
| 5,105,619 A * | 4/1992 | Arai | | 60/286 |
| 5,426,269 A * | 6/1995 | Wagner et al. | | 181/232 |
| 5,517,820 A * | 5/1996 | Kuroda et al. | | 60/274 |
| 5,582,003 A * | 12/1996 | Patil et al. | | 60/284 |
| 5,787,706 A * | 8/1998 | Smedler et al. | | 60/288 |
| 5,845,486 A * | 12/1998 | Yamashita et al. | | 60/274 |
| 6,212,885 B1 * | 4/2001 | Hirota et al. | | 60/288 |
| 6,887,294 B2 * | 5/2005 | Kanematsu | | 55/418 |
| 6,966,179 B2 * | 11/2005 | Onodera et al. | | 60/295 |
| 7,104,050 B2 * | 9/2006 | Sato et al. | | 60/295 |
| 7,341,699 B2 * | 3/2008 | Thieman et al. | | 422/177 |
| 7,444,803 B2 * | 11/2008 | Iwamoto et al. | | 60/288 |
| 2005/0235622 A1 * | 10/2005 | Cutler et al. | | 55/523 |
| 2007/0283687 A1 * | 12/2007 | Host et al. | | 60/302 |

* cited by examiner

Primary Examiner — Thomas Denion
Assistant Examiner — Diem Tran
(74) Attorney, Agent, or Firm — Barnes & Thornburg LLP (57) ABSTRACT

An exhaust gas aftertreatment device for an internal combustion engine producing the exhaust gas comprises an inlet configured to receive the exhaust gas, an outlet from which the exhaust gas exits the device, an aftertreatment element disposed between the inlet and the outlet, and a flow modification mechanism. The aftertreatment element has a front face receiving the exhaust gas from the inlet of the device, and the flow modification mechanism is configured to modify exhaust gas flow through the aftertreatment element in a manner that maintains uniform temperature across the front face of the element.

12 Claims, 4 Drawing Sheets

SYSTEM FOR MODIFYING EXHAUST GAS FLOW THROUGH AN AFTERTREATMENT DEVICE

FIELD OF THE INVENTION

The present invention relates generally to exhaust gas aftertreatment components for internal combustion engines, and more specifically to structures and techniques for optimizing exhaust gas flow through one or more such aftertreatment components.

BACKGROUND

It is generally known to process exhaust gas produced by an internal combustion engine via one or more exhaust gas aftertreatment devices for the purpose of reducing exhaust gas emissions. It is desirable to modify the flow pattern of exhaust gas through one or more such exhaust gas aftertreatment devices for at least the purposes of optimizing the regeneration performance, and maximizing the useful life, thereof.

SUMMARY

The present invention may comprise one or more of the features recited in the attached claims, and/or one or more of the following features and combinations thereof. An exhaust gas aftertreatment device for an internal combustion engine producing the exhaust gas may comprise an inlet configured to receive the exhaust gas, an outlet from which the exhaust gas exits the device, an aftertreatment element disposed between the inlet and the outlet, and a flow modification mechanism. The aftertreatment element may have a front face configured to receive the exhaust gas from the inlet. The flow modification mechanism may be configured to modify exhaust gas flow through the aftertreatment element in a manner that maintains uniform temperature across the front face.

The device may further include a control circuit configured to control operation of the flow modification mechanism. The flow modification mechanism may include a first position operable to maintain uniform temperature across the front face by modifying exhaust gas flow through at least a portion of the aftertreatment element, and a second position providing no restriction to exhaust gas flow through the aftertreatment element. The control circuit may be configured to selectively control the flow modification mechanism between the first and second positions. The flow modification mechanism may include a flow control valve. The flow control valve may include a plate defining a number of passageways therethrough. The plate may be juxtaposed over a center portion of the aftertreatment element when the flow control valve is controlled by the control circuit to the first position. The number of passageways defined through the plate may increase in cross-sectional flow area radially outwardly from a center of the plate toward an outer periphery of the plate to provide for incrementally increased exhaust gas flow through the plate from the center of the plate toward the outer periphery of the plate. The number of passageways may be defined through the plate in a pattern extending radially outwardly from a center of the plate.

The control circuit may be configured to control the flow modification mechanism to the first position if regeneration of the device is about to be commanded, and to otherwise control the flow modification mechanism to the second position. The device may further comprise means for determining a rotational speed of the engine. Alternatively or additionally, the control circuit may be configured to control the flow modification mechanism to the first position if the rotational speed of the engine is at or near an idle speed. The control circuit may be configured to control the flow modification to the first position for at least a predefined time period following completion of regeneration of the device.

The exhaust gas aftertreatment device may be an exhaust gas particulate filter device. The aftertreatment element may be an exhaust gas particulate filter.

An exhaust gas aftertreatment device for an internal combustion engine producing the exhaust gas may comprise an inlet configured to receive the exhaust gas, an outlet from which the exhaust gas exits the device, an aftertreatment element disposed between the inlet and the outlet, and a flow modification mechanism. The aftertreatment element may have a front face configured to receive the exhaust gas from the inlet, and may define a center portion therethrough surrounded by an outer periphery. The exhaust gas may normally flow mainly through the center portion and less so through the outer periphery resulting in non-uniform heating of the front face. The flow modification mechanism may be configured to modify exhaust gas flow through the aftertreatment element in a manner that minimizes temperature gradients across the front face by increasing exhaust gas flow to the outer periphery and decreasing exhaust gas flow to the center portion.

The device may further include a control circuit configured to control operation of the flow modification mechanism. The flow modification mechanism may include a first position operable to increase exhaust gas flow to the outer periphery while decreasing exhaust gas flow to the center portion by restricting exhaust gas flow through the center portion of the aftertreatment element, and a second position providing no restriction to exhaust gas flow through the aftertreatment element. The control circuit may be configured to selectively control the flow modification mechanism between the first and second positions.

The exhaust gas aftertreatment device may be an exhaust gas particulate filter device. The aftertreatment element may be an exhaust gas particulate filter.

A method of regenerating an exhaust gas aftertreatment device having an aftertreatment element may comprise prior to regenerating the device, modifying exhaust gas flow through the aftertreatment element in a manner that establishes at least a near uniform temperature across a face of the element that receives exhaust gas, and after modifying the exhaust gas flow through the aftertreatment element, increasing a temperature of the aftertreatment element directly to a regeneration temperature.

Exhaust gas may be supplied to the exhaust gas aftertreatment device by an internal combustion engine. The method may further comprise modifying exhaust gas flow through the aftertreatment element in the manner that establishes a uniform temperature across the face of the element that receives exhaust gas whenever a rotational speed of the engine is at least near an idle speed.

The method may further comprise modifying exhaust gas flow through the aftertreatment element in a manner that increases exhaust gas flow through an outer periphery of the aftertreatment element following regeneration of the exhaust gas aftertreatment device.

DESCRIPTION OF THE ILLUSTRATIVE EMBODIMENT

For the purposes of promoting an understanding of the principles of the invention, reference will now be made to one illustrative embodiment shown in the attached drawings and specific language will be used to describe the same.

Figure 1:
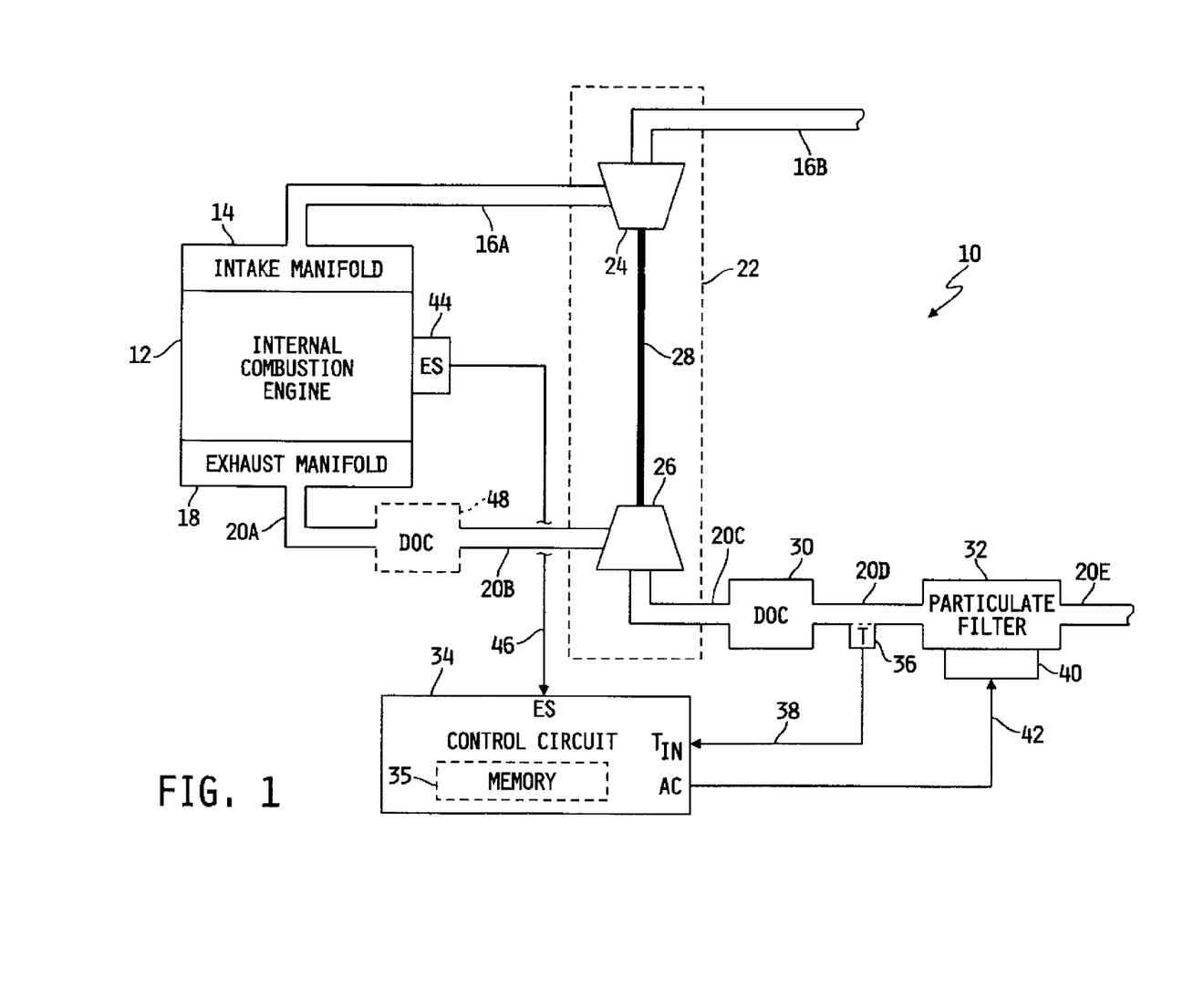
FIG. 1 is a block diagram of a system for selectively modifying exhaust gas flow through an exhaust gas aftertreatment device.

Referring now to FIG. 1, a block diagram of a system 10 for selectively modifying exhaust gas flow through an exhaust gas aftertreatment device is shown. In the illustrated embodiment, the system 10 includes an internal combustion engine 12 having an intake manifold 14 fluidly coupled to an intake conduit 16A for receiving intake air. An exhaust manifold 18 of the engine 12 is fluidly coupled to an exhaust gas conduit 20A. Exhaust gas produced by the engine 12 exits through the exhaust manifold 18 and exhaust gas conduit 20A in a conventional manner. In the illustrated embodiment, the system 10 further includes a conventional turbocharger 22 having a compressor 24 defining a compressor outlet fluidly coupled to the intake conduit 16A and a compressor inlet fluidly coupled to another intake conduit 16B. The compressor 24 is mechanically coupled to a turbine 26 via a rotatable drive shaft 28. The turbine 26 has a turbine inlet that is fluidly coupled to an exhaust manifold 20B, which is itself fluidly coupled to the exhaust gas manifold 20A, and a turbine outlet that is fluidly coupled to another exhaust gas manifold 20C. Operation of the turbocharger 22 is conventional in that a turbine wheel (not shown) housed within the turbine 26 is responsive to the flow of exhaust gas through the exhaust gas conduits 20A and 20B to rotationally drive the drive shaft 28 and thereby rotate a compressor wheel (not shown) housed within the compressor 24. The rotational speed of the turbine wheel is proportional to the flow rate of exhaust gas through the turbine 26, and the mass flow rate of air into the intake manifold 16A is therefore, in turn, proportional to the rotational speed of the compressor wheel. Those skilled in the art will recognize that the turbocharger 22 is not essential for operation and control of the one or more exhaust gas aftertreatment devices, as will be described in greater detail hereinafter. Accordingly, the turbocharger 22 may not be included in some embodiments of the system 10, and in such embodiments the intake conduit 16A is directly coupled to the intake conduit 16B, and the exhaust gas conduit 20B is directly coupled to the exhaust gas conduit 20C.

In any case, the exhaust gas conduit 20C is fluidly coupled to an inlet of an oxidation catalyst device 30. An outlet of the oxidation catalyst device 30 is fluidly coupled via an exhaust conduit 20D to an inlet of a particulate filter 32 having an outlet fluidly coupled to another exhaust conduit 20E. Although not illustrated in FIG. 1, it will be appreciated that in some embodiments of the system 10, one or more additional exhaust gas aftertreatment components may additionally be included in-line with either or both of the exhaust conduits 20D and 20E. Examples of such one or more additional exhaust gas aftertreatment components include, but are not limited to, a conventional NOx adsorber or filter, a conventional SOx adsorber or filter, and the like.

The system 10 further includes a control circuit 34 having a memory unit 35. The control circuit 34 is, in one exemplary embodiment, microprocessor-based and operable execute a number of software algorithms for controlling various features of the system 10. In an alternative embodiment, the control circuit 34 may be or include any one or more electronic circuits and/or components operable as described hereinafter.

The particulate filter 32 includes an exhaust gas flow modification mechanism, as will be described in greater detail hereinafter, and the system 10 accordingly includes an exhaust gas modification mechanism actuator 40 that is electrically connected to a actuator output, AC, of the control circuit 34 via a signal path 42. The control circuit 34 is operable to control operation of the exhaust gas flow modification mechanism included within the particulate filter 32 by controlling operation of the actuator 40 in a conventional manner. The actuator 40 may be a conventional actuator, such as of the type typically used to actuate a conventional valve or conventional throttle plate, although the present disclosure contemplates the use of other conventional or non-conventional actuators.

The control circuit 34 further includes a number of inputs for receiving sensor-based information and other data relating to the operation of the system 10. For example, the system 10 includes a temperature sensor 36 that is electrically connected to an exhaust temperature input, $T_{IN}$, of the control circuit 34 via a signal path 38. The temperature sensor 36 is positioned in fluid communication with the exhaust gas conduit 20D adjacent to the exhaust gas inlet of the particulate filter 32, although the temperature sensor 44 may alternatively be positioned anywhere along the exhaust gas conduit 20D. In any case, the temperature sensor 36 is operable to produce a temperature signal on signal path 38 that is indicative of the temperature of the exhaust gas flowing thereby, and the control circuit 34 includes one or more software algorithms operable to process this temperature signal and determine therefrom the temperature of exhaust gas flowing out of the oxidation catalyst device 30 and/or into the particulate filter 32. In an alternative embodiment, the control circuit 34 may include one or more conventional software algorithms for estimating the temperature of exhaust gas flowing out of the oxidation catalyst device 30 and/or into the particulate filter 32 as a function of a number of other engine operating parameters.

The system 10 further includes an engine speed sensor 44 having an output that is electrically connected to an engine speed input, ES, of the control circuit 34 via a signal path 46. The engine speed sensor 44 may be a conventional speed sensor that is suitably positioned relative to the engine 12 so as to detect the speed of a rotating component of the engine, e.g., the engine crankshaft (not shown) and produce an engine speed signal corresponding thereto.

In the illustrated embodiment, the oxidation catalyst device 30 is shown positioned adjacent to the particulate filter 32 so that the outlet of the oxidation catalyst device 30 is adjacent to the inlet of the particulate filter 32. Alternatively, as shown in phantom in FIG. 1, an oxidation catalyst device 48 may be interposed between the exhaust gas conduits 20A and 20B, in a so-called "close-coupled" configuration, with the inlet of the oxidation catalyst device 48 positioned adjacent to the outlet of the exhaust manifold 18. Otherwise, the exhaust gas conduit 20A is fluidly coupled directly to the exhaust gas conduit 20B. It will be appreciated that in embodiments that include a close-coupled catalyst 48, the output of the catalyst 48 will generally not be positioned upstream of the turbine 26. Rather, in some embodiments the turbocharger 22 may be omitted, and in embodiments that include the turbocharger 22 the close-coupled catalyst 48, if included, will be positioned near the outlet of the turbine 26.

Figure 2A:
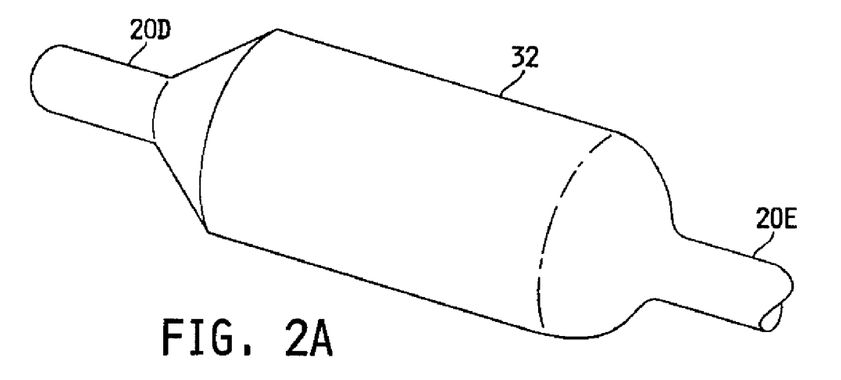
FIG. 2A is a perspective view of the exhaust gas aftertreatment device of FIG. 1.
Figure 2B:
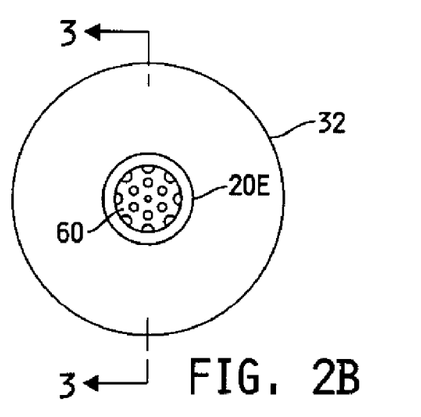
FIG. 2B is an end elevational view of the exhaust gas aftertreatment device of FIG. 2A.

Referring now to FIGS. 2A and 2B, perspective and end-elevational views of one embodiment of the particulate filter 32 of FIG. 1 are shown. In the illustrated embodiment, the particulate filter 32 is a generally cylindrical device having an inlet configured to be fluidly coupled to the exhaust gas conduit 20D and an outlet configured to be fluidly coupled to the exhaust gas conduit 20E. It will be understood, however, that the particulate filter 32 need not be cylindrically shaped, and may instead have any desired shape.

Figure 3:
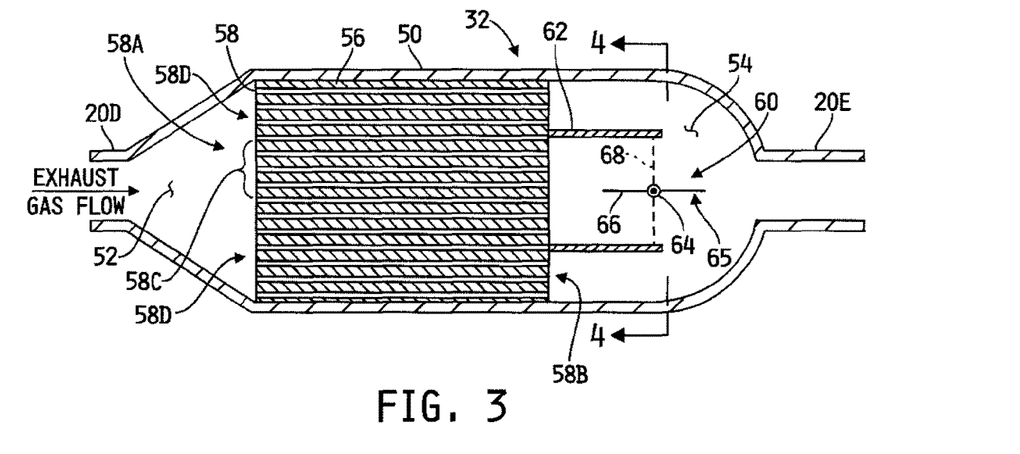
FIG. 3 is a cross-section of the exhaust gas aftertreatment device of FIGS. 2A and 2B, viewed along section lines 3-3.

Referring now to FIG. 3, a cross-section of the particulate filter 32 of FIGS. 2A and 2B is shown as viewed along section lines 3-3 of FIG. 2B. Also referring to FIG. 4, a cross-section of the particulate filter 32 of FIG. 3 is shown as viewed along section lines 4-4. In the embodiment illustrated in FIGS. 3 and 4, the particulate filter 32 includes a housing in the form of an outer shell 50 defining a cavity therein. The inlet of the particulate filter 32, which is fluidly coupled to the exhaust gas conduit 20D, feeds a front chamber 52 of the cavity. The outlet of the particulate filter 32, which is fluidly coupled to the exhaust gas conduit 20E, is fluidly coupled to a rear chamber 54 of the cavity in which an exhaust gas flow modification mechanism 60, as briefly described hereinabove, is arranged. Between the front and rear chambers 52 and 54 respectively, the particulate filter 32 defines a fluid passageway 56. An exhaust gas aftertreatment element 58 is disposed in the fluid passageway 56, and the aftertreatment element 58 extends between the front and rear chambers 52 and 54 respectively.

Figure 4:
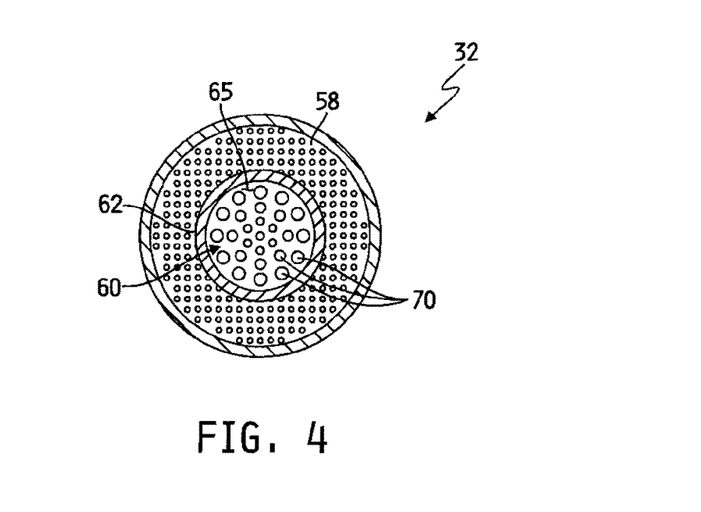
FIG. 4 is a cross-section of the exhaust gas aftertreatment device of FIG. 3, viewed along section lines 4-4.

In the illustrated embodiment, the aftertreatment element 58 is provided in the form of a conventional particulate filter element that defines a number of passageways therein designed to trap particulate matter carried by the exhaust gas stream. The particulate filter element 58 is formed from conventional material compositions, and in one embodiment the filter element 58 is formed from Cordierite, although the element 58 may alternatively be formed from other conventional material compositions such as, for example, Silicon Carbide. The aftertreatment element 58 has a front face 58A that is exposed to the front chamber 52 and therefore receives the exhaust gas stream from the inlet of the particulate filter 32. Exhaust gas exits the aftertreatment element 58 from a rear face 58B of the aftertreatment element 58. The front face 58A of the aftertreatment element 58 defines a center portion 58C that extends radially about a longitudinal axis extending centrally through the length of the element 58, and an outer portion 58D that extends radially about the center portion 58C and terminates at a sidewall of the element 58 that is positioned adjacent to an inner surface of the portion of the housing 50 defining the fluid passageway 56.

The exhaust gas flow modification mechanism 60 is configured to selectively modify exhaust gas flow through the aftertreatment element 58 in a manner that maintains uniform temperature across the front face 58A. Generally, two primary physical phenomena associated with the structure of the particulate filter 32 illustrated in FIGS. 2A-4 cause the front face 58A of the aftertreatment element 58 to heat non-uniformly in the absence of the exhaust gas flow modification mechanism 60. A first such phenomenon relates to known fluid flow concepts which cause the flow of exhaust gas to be concentrated longitudinally through the center portion 58C of the aftertreatment filter element 58. The exhaust gas flowing through the particulate filter 32, in the absence the exhaust gas flow modification mechanism 60, thus normally flows mainly through the center portion 58C and less so through the outer periphery 58D, resulting in non-uniform heating of the front face 58A. Another such phenomena relates to known heat transfer relationships which cause heat from the outer periphery 58D of the aftertreatment element 58 to radiate through the housing 50 to the cooler ambient surrounding the housing 50. Such heat loss from the outer periphery 58D of the aftertreatment element 58 thus results in temperature gradients across the front face 58A of the aftertreatment element 58. The exhaust gas flow modification mechanism 60 is configured to modify exhaust gas flow through the aftertreatment element 58 in a manner that minimizes such temperature gradients across the front face 58A and that compensates for heat loss from the outer periphery 58D of the aftertreatment element 58 to ambient via radiation of heat through the housing 50, by increasing exhaust gas flow to the outer periphery 58D of the aftertreatment element 58 while decreasing exhaust gas flow to the center portion 58C of the aftertreatment element 58.

In the illustrated embodiment, the exhaust gas flow modification mechanism 60 is positioned in the rear chamber 54, although the exhaust gas flow modification mechanism 60 may alternatively be suitably positioned elsewhere within the particulate filter 32, such as, for example, in the front chamber 52. The exhaust gas flow modification mechanism 60 may generally be implemented using any one or more conventional flow control, flow diffusing, flow diverting and/or flow blocking mechanisms or devices. In the illustrated embodiment, for example, the exhaust gas flow modification mechanism 60 is implemented as a single flow control valve 65 positioned within a hollow tube structure 62 having one open end abutting, or in close proximity to, the rear face 58B of the aftertreatment element 58, and an opposite open end extending away from the rear face 58B and toward the outlet of the filter 32. The valve 65 is attached at or near a center point to a mechanical link 64 that is connected to the actuator 40 (FIG. 1), and the valve 65 is controllably positionable about the central point via appropriate control of the actuator 40. The flow modification mechanism 60 has an open position 66 and a closed position 68 (shown in phantom in FIG. 3). In the closed position, the exhaust gas flow modification mechanism 60 ideally causes exhaust gas to flow uniformly into the element 58 across the front face 58A thereof, which will result in maintaining uniform temperature across the front face 58A of the aftertreatment element 58. In the open position 68, the exhaust gas flow modification mechanism provides little, if not negligible, restriction to exhaust gas flow through the aftertreatment element 58. The control circuit 34 is configured to selectively control the flow modification mechanism 60 between the open and closed positions 66 and 68 respectively via appropriate control of the actuator 40.

In the illustrated embodiment, the exhaust gas flow modification mechanism 60, implemented as a single flow control valve 65 positioned within the hollow tube structure 62, defines a plate having a number of passageways 70 therethrough. When the flow control valve 65 is controlled by the control circuit 34 to the closed position 68, the valve 65 is juxtaposed over a center portion 58C of the aftertreatment element 58. The number of passageways 70 defined through the valve 65 increase in cross-sectional flow area radially outwardly from a center of the valve 65 toward an outer periphery of the valve 65 to provide for incrementally increased exhaust gas flow through the valve 65 from the center of the valve toward the outer periphery of the valve. While the number of passageways 70 defined through the valve 65 are illustrated as forming a pattern that extends radially outwardly from a center of the valve 65, the number of passageways 70 may alternatively form a different pattern on the valve 65. It will be further understood that more or fewer such passageways 70 may be defined through the valve 65, and/or that the shapes and/or cross-sectional flow areas through any one or more of the passageways 70 may be modified from those illustrated in FIG. 4. In some alternative embodiments, the valve 65 may be solid, i.e., it may not define any passageways therethrough. It will further be understood that while the valve 65 and hollow tube 62 are illustrated in FIGS. 2B-4 as being generally circular in cross-section, this disclosure alternatively contemplates other cross-sectional geometries for the valve 65 and tube 62.

It will be appreciated that while a number of specific positions of the exhaust gas flow modification mechanism 60 are illustrated and described with respect to FIGS. 3 and 4, it should be understood that the mechanism 60 may be controlled to positions other than those illustrated to achieve desired exhaust gas flow goals. It will also be appreciated that the exhaust gas flow modification mechanism 60 may be implemented in any one or more conventional forms and/or positioned at any one or more desired locations relative to and/or within the particulate filter 32 to achieve any such goals Referring now to FIG. 5, a flow chart is shown of one illustrative software algorithm 100 for controlling operation of the particulate filter 32 of FIGS. 1-4. The algorithm 100 sets forth one illustrative process for controlling the particulate filter 32 generally, and for controlling the exhaust gas flow control mechanism 60 specifically, in a manner that maintains uniform or near-uniform temperature across the front face 58A of the aftertreatment element 58. The algorithm 100 is applicable to control operation of the particulate filter 32 as set forth in the algorithm 100 in embodiments of the system 10 that include the turbocharger 22, in embodiments of the system 10 that do not include the turbocharger 22, in embodiments of the system 10 wherein the oxidation catalyst device 30 is positioned near the particulate filter 32, in embodiments of the system 10 wherein an oxidation catalyst device 48 is positioned near the exhaust manifold 18, in embodiments of the system 10 that include a NOx treatment and/or other exhaust gas aftertreatment device (not shown) and in embodiments of the system 10 that do not include a NOx treatment and/or other exhaust gas aftertreatment device. The software algorithm 100 is stored in the memory unit 35 in the form of one or more conventional software programs and is executed by the control circuit 34 in a conventional manner.

Figure 5:
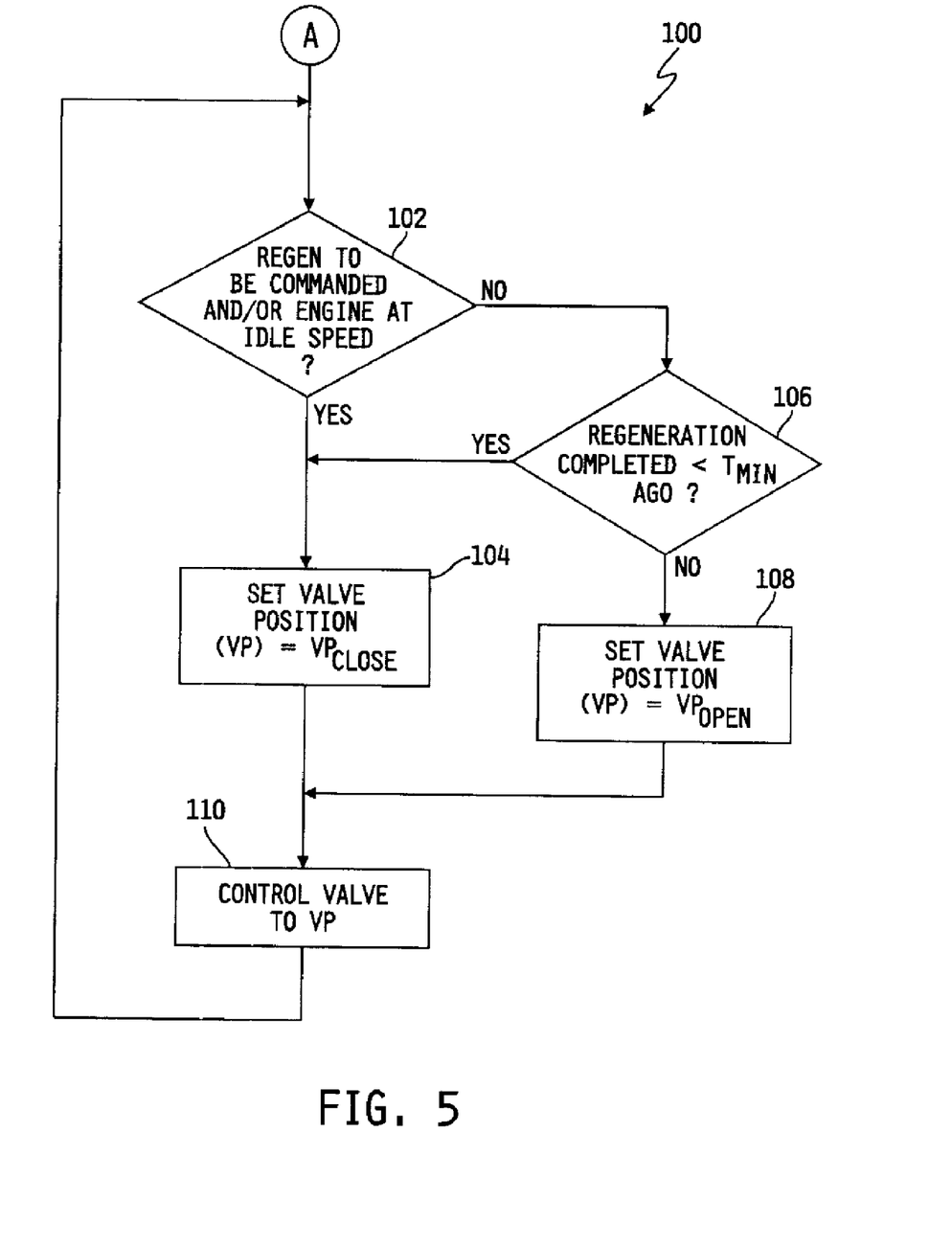
FIG. 5 is a flowchart of one illustrative software algorithm for controlling operation of the exhaust gas aftertreatment device of FIGS. 1-4.

The algorithm 100 begins at step 102 where the control circuit 34 is operable to determine whether regeneration of the particulate filter 32 is about to be commanded and/or whether the engine 12 is running at or near idle speed. In the illustrated embodiment, the control circuit 34 is configured to determine whether the engine 12 is running at or near idle speed by monitoring the engine speed signal on signal path 46 and comparing the corresponding engine speed value to one or more engine speed thresholds.

Generally, any of a number of different measures may be used to determine whether regeneration of the particulate filter 32 is about to be commanded. As one example, the control circuit 34 may be configured to track real time or clock cycles leading up to a regeneration event, and in this example the control circuit 34 may be configured to determine, at step 102, that regeneration of the particulate filter 32 is about to be commanded if the time or number of clock cycles until the regeneration event is less than a predefined time value or a predefined number of clock cycles. As another example, the control circuit 34 may be configured to track the soot or particulate loading of the particulate filter 32, and determine, at step 102, that regeneration of the particulate filter 32 is about to be commanded if the soot or particulate load is within a predefined value of a soot or particulate load that triggers regeneration of the particulate filter 32, or if the soot or particulate load is greater than a predefined soot or particulate load value. An example of one conventional technique for tracking or monitoring soot or particulate load of the particulate filter 32 involves monitoring a pressure differential between the exhaust gas inlet and the exhaust gas outlet of the particulate filter 32, and mapping the pressure differential information to soot or particulate load values in a conventional manner. This technique will typically require one or more sensors or virtual sensors for determining the pressure differential across the particulate filter 32, and it will be understood that in embodiments wherein the control circuit 34 is configured to monitor soot or particulate loading of the particulate filter 32 the system 10 illustrated in FIG. 1 will include any such required sensor or sensors. Those skilled in the art will recognize other techniques for monitoring soot or particulate load of the particulate filter 32, and any such other techniques are contemplated by this disclosure. Those skilled in the art will further recognize other techniques for determining, at step 102, whether regeneration of the particulate filter 32 is about to be commanded, and any such other techniques are also contemplated by this disclosure.

If, at step 102, the control circuit 34 determines that regeneration of the particulate filter 32 is about to occur, the engine 12 is currently running at an idle speed or both, the algorithm 100 advances to step 104 where the control circuit 34 is operable to set a valve position value, VP, to a closed position, $VP_{CLOSE}$. In the embodiment illustrated in FIG. 3, the $VP_{CLOSE}$ valve position corresponds to the valve position 68, which position is also illustrated in FIG. 4. In any case, the valve position $VP_{CLOSE}$ corresponds to a position of the valve 65 that modifies exhaust gas flow through the aftertreatment filter element 58 as described hereinabove.

If, at step 102, the control circuit 34 determines that regeneration of the particulate filter 32 not about to occur and/or the engine 12 is currently not running at an idle speed, execution of the algorithm 100 advances to step 106 where the control circuit 32 is operable to determine whether regeneration of the particulate filter 32 was completed less than a time value, $T_{MIN}$, ago. If so, the algorithm 100 advances to step 104, and if not the algorithm 100 advances to step 108. Generally, the control circuit 34 is configured to control active regeneration of the particulate filter 32, and will therefore have knowledge of when a regeneration event has been completed. Alternatively, the control circuit 32 may be operable at step 106 to determine whether a regeneration event has been completed by monitoring the temperature signal on signal path 38. If the corresponding temperature value increases above a first predefined temperature for a sufficient duration and then thereafter decreases below a second predefined temperature, this temperature sequence will generally be indicative of completion of a particulate filter regeneration event. Alternatively still, the control circuit 34 may be operable at step 106 to monitor soot or particulate loading of the particulate filter 32. If the soot or particulate loading is generally increasing, and then subsequently decreases by a sufficient amount or below a threshold loading value, this will generally be indicative of completion of a regeneration event. Those skilled in the art will recognize other techniques for determining, at step 106, completion of a particulate filter regeneration event, and any such other techniques are contemplated by this disclosure.

If, at step 106, the control circuit 34 determines that regeneration of the particulate filter 32 was completed more than $T_{MIN}$ ago, execution of the algorithm 100 advances to step 108 where the control circuit 34 is operable to set the valve position value, VP, to an open position, $VP_{OPEN}$. In the embodiment illustrated in FIG. 3, the $VP_{OPEN}$ valve position corresponds to the valve position 66. In any case, the valve position $VP_{OPEN}$ corresponds to a position of the valve 65 that offers little or no restriction, redirection or other modification of the exhaust gas flowing into the inlet of the particulate filter 32. With the valve 65 in this position, exhaust gas accordingly flows substantially unimpeded through the aftertreatment filter element 58.

Following either of steps 104 and 108, execution of the algorithm 100 advances to step 110 where the control circuit 34 is operable to control the valve 65 of the particulate filter 32 to VP. Thereafter, algorithm execution loops back to step 102 for continual execution of the algorithm 100.

It is generally understood that the useful lifetime of a particulate filter 32 is inversely proportional to stress imposed on or experienced by the aftertreatment element 58. Accordingly, it is desirable to minimize the stress imposed on or experienced by the element 58 to thereby maximize the useful lifetime of the particulate filter 32. The stress imposed on or experienced by the element 58 is generally understood to follow the formula $\sigma = \alpha * \Delta T * \epsilon$, where $\sigma$ is the stress imposed on or experienced by the aftertreatment element 58, $\alpha$ is coefficient of thermal expansion of the element 58, $\Delta T$ is the temperature differential across the face 58A of the element 58 and E is the elastic modulus of the aftertreatment element 58. The stress imposed on or experienced by the aftertreatment element 58 is thus a function of the radial temperature gradient across the front face 58A of the element 58. For example, if the core 58C of the element 58 heats more quickly than the outer portion 58D, such as in the case when the exhaust gas flow modification mechanism 60 illustrated and described herein is not implemented, the core 58C effectively expands in length, thereby inducing stress on the element 58.

With conventional particulate filters, attempts are typically made to minimize stress imposed on or experienced by the filter element 58 resulting from temperature gradients across the front face 58A thereof by gradually heating the aftertreatment element 58 prior to an active regeneration event. This is typically done by gradually introducing unburned hydrocarbons into the exhaust gas stream that react with the oxidation catalyst 30 to gradually raise the temperature of the exhaust gas exiting the catalyst 30 which, in turn, gradually raises the temperature of the aftertreatment element 58 prior to the regeneration.

By using the techniques described herein, the stress imposed on or experienced by the aftertreatment element 58 may be minimized prior to a regeneration event by controlling the valve 65 to the closed position 68 prior to a regeneration event. As described herein, controlling the valve 65 to the closed position 68 will minimize the thermal gradient across the front face 58A of the aftertreatment element 58, thereby resulting in a uniform or near uniform temperature across the face 58A. According to the stress equation set forth hereinabove, the amount of stress imposed on or experienced by the aftertreatment element is directly proportional to the magnitude of the temperature gradient across the front face 58A of the element 58. By providing for a uniform or near uniform temperature across the face 58A of the aftertreatment element 58 prior to a regeneration event, stress imposed on or experienced by the aftertreatment element 58 will be minimized so that gradual heating of the aftertreatment element 58 to temperatures suitable for regeneration will not be required. As a result, the temperature of the aftertreatment element 58 may be quickly elevated to temperatures suitable for regeneration. A savings in both time and fuel may thus be realized over conventional aftertreatment element heating techniques.

The algorithm 100 of FIG. 5 accomplishes the foregoing feature at steps 102, 104 and 110 by controlling the valve 65 to the closed position 68 when a regeneration event is about to be commanded. In this regard, step 102 may be modified in some embodiments to advance to step 104 only if a regeneration event is about to occur. It is generally understood that while restricting exhaust gas flow through the particulate filter 32 may result in a perceptible degradation of engine performance at higher engine speeds or loads, such degradation in engine performance is typically not perceptible at low, e.g., idle, engine speeds. To avoid any such perceptible engine performance degradation, step 102 may be modified in some embodiments to advance to step 104 only if a regeneration event is about to occur and only under engine idle or near engine idle conditions. In other embodiments, the condition that regeneration of the particulate filter 32 is about to occur may be omitted, and step 102 may thus be modified to advance to step 104 whenever the engine 12 is operating at idle or near idle speeds.

As described hereinabove, heat in the outer periphery 58D of the aftertreatment element 58 is generally lost via radiation through the housing 50 to the cooler ambient surrounding the housing 50. While the exhaust gas flow modification mechanism 60 described herein effectively causes the front face 58A of the aftertreatment element to be at or near a uniform temperature, it generally will not reduce heat loss from the outer periphery 58D through the housing 50 in sections of the outer periphery 58D that are sufficiently remote from the front face 58A. Carbonized particulate matter may accumulate in the outer periphery 58D near the interface between the outer periphery 58D and the housing 50 as regeneration of the aftertreatment element 58 occurs if the heat loss at this interface is significant enough to cause the temperature of the outer periphery 58D to decrease sufficiently. Regeneration of the aftertreatment element 58 may eventually ignite this accumulated, carbonized particulate matter, which will tend to burn on its own in an uncontrolled fashion. This can result in temperatures at the outer periphery 58D that are sufficiently high to melt at least a portion of the outer periphery 58D and/or housing 50. Step 106 may accordingly be included in the algorithm 100 to direct exhaust gas to the outer periphery 58D for a definable time period following regeneration of the aftertreatment element 58. Post-regeneration exhaust gas directed to the outer periphery 58D for a defined time period is intended to cool the outer periphery 58D in an attempt to minimize, or at least reduce, the likelihood of any such uncontrolled burning of accumulated, carbonized particulate matter. It will be understood that step 106 may be omitted in embodiments where such uncontrolled burning of accumulated, carbonized particulate matter is minimized or reduced via another mechanism.

While the invention has been illustrated and described in detail in the foregoing drawings and description, the same is to be considered as illustrative and not restrictive in character, it being understood that only one illustrative embodiment thereof has been shown and described and that all changes and modifications that come within the spirit of the invention are desired to be protected. For example, while the structural and control process concepts described herein were set forth in the context of a particulate filter 32, those skilled in the art will recognize that any such structural and/or control process concepts may also be applied to any one or more other exhaust gas aftertreatment devices, e.g., an oxidation catalyst device, a NOx filter device or the like.

What is claimed is:

1. An exhaust gas aftertreatment device for an internal combustion engine producing the exhaust gas, the aftertreatment device comprising:
    a housing defining an inlet configured to receive the exhaust gas and an outlet from which the exhaust gas exits the aftertreatment device,
    an aftertreatment element positioned within the housing, the aftertreatment element having one end defining a front face that is configured to receive the exhaust gas from the inlet of the housing and an opposite end defining a rear face through which the exhaust gas exits the aftertreatment element,
    an exhaust gas flow modification device separate from the housing and the aftertreatment element and positioned within the housing adjacent to the rear face of the aftertreatment element, the exhaust gas flow modification device configured to modify exhaust gas flow through the aftertreatment element such that a temperature across the front face of the aftertreatment element resulting solely from exhaust gas flow through the aftertreatment element is maintained uniform, the exhaust gas flow modification device being movable between a first position that maintains uniform temperature across the front face of the aftertreatment element by modifying exhaust gas flow through at least a portion of the aftertreatment element, and a second position that does not maintain uniform temperature across the front face of the aftertreatment element, and
    a control circuit configured to selectively control the exhaust gas flow modification device between the first and second positions,
    wherein the exhaust gas flow modification device comprises a flow control valve, and wherein the flow control valve comprises a plate with a number of passageways defined through the plate through which exhaust gas flows when the exhaust gas flow modification device is in the first position.

2. The aftertreatment device of claim 1 wherein the plate is juxtaposed over a center portion of the rear face of the aftertreatment element when the exhaust gas flow modification device is in the first position.

3. The aftertreatment device of claim 1 wherein the number of passageways defined through the plate increase in cross-sectional flow area radially outwardly from a center of the plate toward an outer periphery of the plate to provide for incrementally increased exhaust gas flow through the plate from the center of the plate toward the outer periphery of the plate.

4. The aftertreatment device of claim 1 wherein the control circuit is configured to control the exhaust gas flow modification device to the first position prior to regeneration of the aftertreatment element, and to otherwise control the exhaust gas flow modification device to the second position.

5. The aftertreatment device of claim 1 further comprising means for determining a rotational speed of the engine, wherein the control circuit is configured to control the exhaust gas flow modification device to the first position if the rotational speed of the engine is at or near an idle speed.

6. An exhaust gas aftertreatment device for an internal combustion engine producing the exhaust gas, the aftertreatment device comprising:
    an inlet configured to receive the exhaust gas,
    an outlet from which the exhaust gas exits the aftertreatment device,
    an aftertreatment element positioned between the inlet and the outlet, the aftertreatment element having a front face that is configured to receive the exhaust gas from the inlet and a rear face through which the exhaust gas exits the aftertreatment element, and
    a flow control valve positioned between the rear face of the aftertreatment element and the outlet of the aftertreatment device, the flow control valve configured to modify exhaust gas flow through the aftertreatment element such that a temperature across the front face of the aftertreatment element resulting solely from exhaust gas flow through the aftertreatment element is maintained uniform, wherein the flow control valve comprises a plate with a number of passageways defined through the plate through which exhaust gas flows.

7. The aftertreatment device of claim 6 wherein the number of passageways defined through the plate increase in cross-sectional flow area radially outwardly from a center of the plate toward an outer periphery of the plate to provide for incrementally increased exhaust gas flow through the plate from the center of the plate toward the outer periphery of the plate.

8. The aftertreatment device of claim 6 wherein the plate is juxtaposed over a center portion of the rear face of the aftertreatment element.

9. The aftertreatment device of claim 8 wherein the flow modification mechanism is movable between a first position in which the plate is juxtaposed over the center portion of the rear face of the aftertreatment element such that the temperature across the front face of the aftertreatment element is maintained uniform, and a second position in which the plate is not juxtaposed over the center portion of the rear face of the aftertreatment element,
    and further comprising a control circuit configured to control the flow modification mechanisms between the first and second positions.

10. An exhaust gas aftertreatment device for an internal combustion engine producing the exhaust gas, the aftertreatment device comprising:
    a housing defining an inlet configured to receive the exhaust gas and an outlet from which the exhaust gas exits the aftertreatment device,
    an aftertreatment element positioned within the housing, the aftertreatment element having one end defining a front face that is configured to receive the exhaust gas from the inlet of the housing and an opposite end defining a rear face through which the exhaust gas exits the aftertreatment element, and
    an exhaust gas flow modification device separate from the housing and the aftertreatment element and positioned within the housing adjacent to one of the front face and the rear face of the aftertreatment element, the exhaust gas flow modification device controllable between a first position in which the exhaust gas flow modification device permits generally unobstructed exhaust gas flow to an entirety of the front face of the aftertreatment element and a second position in which the exhaust gas flow modification device at least partially restricts exhaust gas flow to a first area of the front face of aftertreatment element while permitting unobstructed exhaust gas flow to a second remaining area of the front face of the aftertreatment element, wherein the exhaust gas flow modification device comprises a flow control valve, and wherein the flow control valve comprises a plate with a number of passageways defined through the plate through which exhaust gas flows when the exhaust gas flow modification device is in the second position.

11. The aftertreatment device of claim 10 wherein the plate is juxtaposed over a center portion of the one of the front face and the rear face of the aftertreatment element when the exhaust gas flow modification device is in the second position.

12. The aftertreatment device of claim 10 wherein the number of passageways defined through the plate increase in cross-sectional flow area radially outwardly from a center of the plate toward an outer periphery of the plate to provide for incrementally increased exhaust gas flow through the plate from the center of the plate toward the outer periphery of the plate.

* * * * *